United States Patent
Kawaguchi

(10) Patent No.: US 6,658,560 B1
(45) Date of Patent: Dec. 2, 2003

(54) PROGRAM TRANSLATOR AND PROCESSOR

(75) Inventor: Kenichi Kawaguchi, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/536,308

(22) Filed: Mar. 27, 2000

(30) Foreign Application Priority Data

Mar. 29, 1999 (JP) ............................................ 11-086561

(51) Int. Cl.[7] .............................. G06F 9/38; G06F 9/54; G06F 9/30
(52) U.S. Cl. ...................... 712/245; 712/229; 712/203; 712/215; 712/219
(58) Field of Search ................................. 712/216, 206, 712/229, 233, 239, 245, 219, 215, 30, 23, 41, 213, 24, 203, 237

(56) References Cited

U.S. PATENT DOCUMENTS 5,784,630 A * 7/1998 Saito et al. .................. 712/229
5,790,826 A * 8/1998 Thusoo et al. ............... 712/216
6,338,133 B1 * 1/2002 Schroter ...................... 712/233

FOREIGN PATENT DOCUMENTS

JP   5-265769   10/1993

* cited by examiner

*Primary Examiner*—Daniel H. Pan
(74) *Attorney, Agent, or Firm*—McDermott, Will & Emery

(57) ABSTRACT

Multiple instructions, specifying equivalent operations but designating different execution units, are stored beforehand on an instruction exchange table. First, a primary compiler compiles a source program into a set of machine-readable instructions. From the set of instructions, an instruction parallelizer generates a set of long instruction words. Specifically, an instruction identifier identifies one of the instructions in the set with one of the instructions stored on the instruction exchange table. Then, an instruction replacer replaces the instruction in question with another one of the instructions that is also stored on the instruction exchange table, specifies an equivalent operation but designates a different execution unit as a target. In this manner, the number of parallelly executable instructions can be increased, while the number of no-operation instructions can be reduced, thus generating a parallelized instruction set at a higher level of parallelism.

9 Claims, 21 Drawing Sheets

Fig. 4 instruction set

| instruction | mnemonic | description | placeable slot | | computational resource |
|---|---|---|---|---|---|
| | | | first | second | |
| ADD | add Rn, Rm | write Rm+Rn on Rm | YES | NO | adder 304 |
| SUBTRACT | sub Rn, Rm | write Rm-Rn on Rm | YES | NO | adder 304 |
| SHIFT LEFT | asl imm, Rm | write Rm<<imm on Rm | NO | YES | shifter 305 |
| SHIFT RIGHT | asr imm, Rm | write Rm>>imm on Rm | NO | YES | shifter 305 |
| MOVE | mov Rn, Rm | write Rn on Rm | YES | YES | -- |
| LOAD | ld mem, Rm | write value at mem on Rm | NO | YES | -- |
| STORE | st Rn, mem | write Rn on mem | NO | YES | -- |
| NOP | nop | no operation | YES | YES | -- |

Fig. 5 instruction exchange table

| instruction set 1 | add Rm, Rm |
|---|---|
| | asl 1, Rm | instruction set 1. asl 1, R0
2. add R1, R1

Fig. 12 instruction set 1. add R2, R2
2. asr 2, R1
3. add R1, R1
4. sub R2, R3
5. add R2, R1
6. asl 3, R2
7. add R0, R2

Fig. 13

| long instruction word | first instruction slot | second instruction slot |
|---|---|---|
| 1. | add R2, R2 | asr 2, R1 |
| 2. | add R1, R1 | nop |
| 3. | sub R2, R3 | nop |
| 4. | add R2, R1 | asl 3, R2 |
| 5. | add R0, R2 | nop |

Fig. 14 instruction set
1. add R2, R2
2. asr 2, R1
3. asl 1, R1
4. sub R2, R3
5. add R2, R1
6. asl 3, R2
7. add R0, R2

Fig. 15

| long instruction word | first instruction slot | second instruction slot |
|---|---|---|
| 1. | add R2, R2 | asr 2, R1 |
| 2. | sub R2, R3 | asl 1, R1 |
| 3. | add R2, R1 | asl 3, R2 |
| 4. | add R0, R2 | nop |

Fig. 16 instruction set 1. asl 1, R2
2. asr 2, R1
3. sub R2, R3
4. add R1, R1
5. add R2, R1
6. asl 3, R2
7. add R0, R2

Fig. 17

| long instruction word | first instruction slot | second instruction slot |
|---|---|---|
| 1. | nop | asl 1, R2 |
| 2. | sub R2, R3 | asr 2, R1 |
| 3. | add R1, R1 | nop |
| 4. | add R2, R1 | asl 3, R2 |
| 5. | add R0, R2 | nop |

Fig. 19 instruction exchange table 2

| instruction class | instruction group | instruction set | |
|---|---|---|---|
| instruction class 1 | instruction group 1 | instruction set 1 | 1. add Rm, Rm |
| | instruction group 2 | instruction set 2 | 1. asl 1, Rm |
| instruction class 2 | instruction group 3 | instruction set 3 | 1. mov Rn, Rm<br>2. asl 1, Rn<br>3. add Rm, Rn |
| | | instruction set 4 | 1. mov Rn, Rm<br>2. asl 2, Rn<br>3. sub Rm, Rn |
| | instruction group 4 | instruction set 5 | 1. mov Rn, Rm<br>2. add Rn, Rn<br>3. add Rm, Rn |

Fig. 20 instruction set 1. mov R0, R1
2. asl 2, R0
3. sub R1, R0
4. mov R2, R3
5. asl 2, R2
6. sub R3, R2
7. ld (mem1), R1
8. asl 1, R1
9. st R1, (mem1)

Fig. 21

| long instruction word | first instruction slot | second instruction slot |
|---|---|---|
| 1. | mov R0, R1 | mov R2, R3 |
| 2. | nop | asl 2, R0 |
| 3. | sub R1, R0 | asl 2, R2 |
| 4. | sub R3, R2 | ld(mem1), R1 |
| 5. | nop | asl 1, R1 |
| 6. | nop | st R1, (mem1) |

Fig. 22 instruction set
1. mov R0, R1
2. asl 2, R0
3. sub R1, R0
4. mov R2, R3
5. add R2, R2
6. add R3, R2
7. ld(mem1), R1
8. asl 1, R1
9. st R1, (mem1)

Fig. 23

| long instruction word | first instruction slot | second instruction slot |
|---|---|---|
| 1. | mov R0, R1 | mov R2, R3 |
| 2. | add R2, R2 | asl 2, R0 |
| 3. | sub R1, R0 | ld(mem1), R1 |
| 4. | add R3, R2 | asl 1, R1 |
| 5. | nop | st R1, (mem1) |

A. add R3, R2
B. add R0, R0
C. add R1, R1
D. sub R2, R0

A. add R3, R2
E. asl 1, R0
F. asl 1, R1
D. sub R2, R0

Fig. 29 instruction set

| instruction | mnemonic | description | computational resource | execution time (in cycles) |
|---|---|---|---|---|
| ADD | add Rn, Rm | write Rm+Rn on Rm | adder 3409 | 1 |
| SUBTRACT | sub Rn, Rm | write Rm−Rn on Rm | adder 3409 | 1 |
| SHIFT LEFT | asl imm, Rm | write Rm<<imm on Rm | shifter 3410 | 1 |
| SHIFT RIGHT | asr imm, Rm | write Rm>>imm on Rm | shifter 3410 | 1 |
| MULTIPLY | mul imm, Rm | write Rm×imm on Rm | multiplier 3411 | 3 |
| MOVE | mov Rn, Rm | write Rn on Rm | -- | 1 |
| LOAD | ld mem, Rm | write value at mem on Rm | -- | 1 |
| STORE | st Rn, mem | write Rn on mem | -- | 1 |
| NOP | nop | no operation | -- | 1 |

Fig. 30 instruction exchange table

| | | |
|---|---|---|
| instruction group 1 | instruction to be exchanged | mul 2, Rm |
| | set of substitute instructions | add Rm, Rm |
| | number of substitute instructions | 1 |
| instruction group 2 | instruction to be exchanged | mul 3, Rm |
| | set of substitute instructions | mov Rm, RR<br>asl 1, Rm<br>add RR, Rm |
| | number of substitute instructions | 3 |
| instruction group 3 | instruction to be exchanged | mul 4, Rm |
| | set of substitute instructions | asl 2, Rm |
| | number of substitute instructions | 1 |
| instruction group 4 | instruction to be exchanged | mul 5, Rm |
| | set of substitute instructions | mov Rm, RR<br>asl 2, Rm<br>add RR, Rm |
| | number of substitute instructions | 3 |
| instruction group 5 | instruction to be exchanged | mul 6, Rm |
| | set of substitute instructions | mov Rm, RR<br>asl 2, Rm<br>asl 1, RR<br>add RR, Rm |
| | number of substitute instructions | 4 |

A.    mul 5, R0
B.    mul 3, R1

Fig. 32

A.    mul 5, R0
C.    mov R1, RR
D.    asl 1, R1
E.    add RR, R1

PROGRAM TRANSLATOR AND PROCESSOR

BACKGROUND OF THE INVENTION

The present invention generally relates to a microprocessor with very long instruction word (VLIW), superscalar or out-of-order completion architecture. More particularly, the present invention relates to program translator and processor realizing parallel processing down to the level of individual instructions by making efficient use of execution units.

In recent years, various microprocessors, such as VLIW, superscalar and out-of-order completion types, have been developed one after another to execute multiple instructions at a time more rapidly.

Some of compilers, which designate a VLIW microprocessor as a target, define an instruction set and then parallelize the instructions included in the set in such a manner as to satisfy various constraints concerning the availability of execution units of the microprocessor or instruction slots of a long instruction word.

A program translator of this type is disclosed, for example, in Japanese Laid-Open Publication No. 5-265769.

If a source program shown at the top of FIG. 6 is compiled using a prior art program translator, an instruction set shown in the middle of FIG. 6 is generated from the source program. Next, the instructions included in this instruction set are parallelized to generate a set of long instruction words with a step number of 2 as shown at the bottom of FIG. 6. In the second instruction slot of each long instruction word, a no-operation instruction (NOP) is inserted.

Also, if a program shown in FIG. 25 is executed using a conventional superscalar processor, then the processor executes the instructions in 5 cycles by pipelining shown in FIG. 34.

Furthermore, if a program shown in FIG. 31 is executed using another conventional processor including a multiplier that can perform multiplication in 3 cycles, then the processor executes the instructions in 7 cycles by pipelining shown in FIG. 35.

The prior art program translators, however, have various shortcomings. For example, an instruction set generated from source program is not always executable at a high parallelism level because some constraints are often imposed by a processor with limited execution units as targets. Accordingly, many NOP's should be inserted to parallelize the instructions, thus constituting a serious obstacle to performance enhancement.

Also, in the prior art superscalar processor, even if multiple instructions are decoded at a time, just part of these instructions are executable because available execution units are limited. Thus, the resultant performance is not fully satisfactory, either.

Furthermore, in still another prior art processor, if an execution unit should perform a sequence of operations each taking several clock cycles to execute, then succeeding operations cannot be started until these operations are completed. As a result, the performance of such a process is not so good.

SUMMARY OF THE INVENTION

An object of the present invention is providing a program translator that can obtain a set of instructions that have been parallelized to a high level of parallelism.

Another object of the present invention is providing a processor that can perform computational processing rapidly by making more efficient use of execution units.

To achieve these objects, according to the present invention, if there are two instructions that designate the same execution unit as their target, then one of the two instructions is replaced with another instruction that designates a different execution unit.

A program translator according to the present invention includes instruction exchanging means for exchanging one of instructions included in a program for another instruction. The latter instruction specifies an operation equivalent to that specified by the former instruction and designates, as a target of the operation, an execution unit that is different from an execution unit designated as a target by the former instruction. The program translator further includes instruction parallelizing means for placing the instructions in the program, in which the former instruction has been exchanged for the latter instruction by the exchanging means, at such locations as being parallelly executable by a processor.

In one embodiment of the invention, the exchanging means may include equivalent instruction storage means for storing multiple instructions that specify equivalent operations but designate mutually different execution units as targets of the operations; instruction identifying means for identifying at least one of the instructions included in the program with one of the instructions stored on the storage means; and instruction replacing means for replacing the at least one instruction, which has been identified by the identifying means, with another one of the instructions that is also stored on the storage means but is different from the at least one instruction.

In another embodiment of the present invention, the program translator may further include parallelism-level calculating means for calculating a parallelism level of the instructions that have been parallelized by the instruction parallelizing means.

In still another embodiment, the instruction exchanging means may include equivalent instruction set storage means for storing multiple instruction sets specifying mutually equivalent operations. If two of the instruction sets each designate the same set of execution units as targets of their operations in the same order, these two instruction sets belong to the same group of instructions. The instruction exchanging means may further include: instruction subset identifying means for identifying a subset of the program with one of the instruction sets stored on the storage means; instruction group selecting means for selecting an instruction group that is different from a group to which the instruction set, identified by the identifying means with the instruction subset, belongs; and instruction set replacing means for replacing the instruction subset, which has been identified by the identifying means, with an instruction set included in the instruction group, which has been selected by the selecting means.

Another program translator according to the present invention includes: instruction parallelizing means for generating a set of parallelized instructions by placing instructions at such locations as being parallelly executable by a processor; equivalent instruction storage means for storing multiple instructions that specify equivalent operations but designate mutually different execution units as targets of the operations; no-operation instruction finding means for finding a no-operation instruction from the parallelized instructions located in a predetermined range of the parallelized instruction set; substitute instruction selecting means for selecting, if one of the parallelized instructions including the no-operation instruction found is the same as one of the instructions stored on the storage means, a substitute one of the instructions, which is also stored on the storage means but is different from the instruction included in the parallelized instructions; and instruction replacing means for replacing the instruction included in the parallelized instructions with the substitute instruction selected by the selecting means.

In one embodiment of the present invention, the program translator may further include: effective range searching means for searching the parallelized instruction set for a subset of instructions, which does not cause register conflict with any of the parallelized instructions; and second no-operation instruction finding means for finding a no-operation instruction from parallelized instructions included in the instruction subset that has been found by the searching means. The replacing means replaces the no-operation instruction, which has been found by the second finding means, with the instruction that has been selected by the selecting means.

A processor according to the present invention includes: a first execution unit; a second execution unit; and instruction parallelizing/executing means for executing two instructions, which both designate the first execution unit as a target, in parallel by allocating one of the two instructions to the second execution unit.

In one embodiment of the present invention, the parallelizing/executing means may include: instruction recognizing means for recognizing the two instructions as instructions both designating the first execution unit as the target; allocation changing means for allocating one of the two instructions that designate the first execution unit as the target to the second execution unit; and parallel executing means for executing the two instructions in parallel.

Another processor according to the present invention includes: a first execution unit, on which an operation will be performed in a first number of cycles; at least one second execution unit, on which an operation will be performed in a second number of cycles, the second number being smaller than the first number; instruction recognizing means for recognizing a predetermined instruction as an instruction designating the first execution unit as a target of the operation; and instruction exchanging means for exchanging the predetermined instruction that has been recognized by the recognizing means with at least one instruction that specifies an operation equivalent to that specified by the instruction and designates the second execution unit as a target.

In one embodiment of the present invention, the exchanging means includes: instruction set searching means for searching for an instruction set that specifies an operation equivalent to that specified by the predetermined instruction; comparing means for comparing a point in time execution of the instruction set found by the searching means is completed to a point in time execution of the predetermined instruction is completed; and instruction replacing means for replacing, if the comparing means has determined that the execution of the instruction set will be completed earlier than that of the predetermined instruction, the predetermined instruction with the instruction set.

According to the present invention, the program translator replaces an instruction in question, which is included in an original program, with a substitute instruction that specifies the same operation but designates a different execution unit as a target. Thus, even if the instruction in question and the other instructions included in the same program cannot be executed in parallel because all of these instructions specify the same execution unit as their target, the substitute instruction and the remaining instructions are executable parallelly. This is because the execution unit designated by the substitute instruction is different from that designated by the remaining instructions. As a result, the number of parallelly executable instructions can be increased, while the number of no-operation instructions can be reduced. In this manner, a set of parallelized instructions can be generated to a higher level of parallelism.

In addition, according to the present invention, multiple instructions included in a single set are replaced at a time with corresponding instructions specifying equivalent operations. Accordingly, even if instructions in a set cannot be replaced one by one, the instruction set can be exchanged for a substitute instruction set, which designates an execution unit different from that designated by the other instruction sets, thereby increasing the number of parallelly executable instructions. In this manner, the number of no-operation instructions included in a parallelized instruction set can be reduced and the parallelism level thereof can be increased.

Suppose there are two parallelized instructions, one of which includes a first instruction and a no-operation instruction and the other of which includes a second instruction and a no-operation instruction. In such a situation, the present invention combines these two parallelized instructions into one consisting of the first and second instructions, thereby reducing the number of parallelized instructions and increasing the parallelism level.

Two instructions designating the same execution unit as their target cannot be executed in parallel, generally speaking. In the processor according to the present invention, however, one of these two instructions is replaced with a substitute instruction designating an originally free execution unit. Accordingly, the number of parallelly executable instructions and the program processing speed can be both increased.

In general, while an instruction of the type taking several clock cycles to complete is being executed using a first execution unit, the first execution unit is not available for a next instruction, and therefore the execution of the next instruction should usually be suspended. In contrast, according to the processor of the present invention, the next instruction is replaced with a substitute instruction specifying a second execution unit. In this manner, these two instructions can be executed in parallel, thus speeding up the program processing.

BRIEF DESCRIPTION OF THE DRAWINGS

FIG. 4 illustrates an exemplary instruction set used in the first embodiment.

FIG. 5 illustrates the contents of an instruction exchange table for the program translator according to the first embodiment.

FIG. 12 illustrates an exemplary instruction set used in the second embodiment.

FIG. 13 illustrates a set of long instruction words that has been generated from the instruction set shown in FIG. 12.

FIG. 14 illustrates an instruction set obtained by the program translator according to the second embodiment.

FIG. 15 illustrates a set of long instruction words obtained by the program translator according to the second embodiment.

FIG. 16 illustrates an instruction set used to explain the effects of the program translator.

FIG. 17 illustrates a set of long instruction words used to explain the effects of the program translator.

FIG. 19 illustrates the contents of an instruction exchange table for the program translator according to the third embodiment.

FIG. 20 illustrates an exemplary instruction set used in the third embodiment.

FIG. 21 illustrates a set of long instruction words generated from the instruction set shown in FIG. 20.

FIG. 22 illustrates an instruction set obtained by the program translator according to the third embodiment.

FIG. 23 illustrates a set of long instruction words obtained by the program translator.

FIG. 29 illustrates an exemplary instruction set used in the fifth embodiment.

FIG. 30 illustrates the contents of an instruction exchange table for the program translator according to the fifth embodiment.

FIG. 31 illustrates an exemplary instruction set included in a program stored on a program memory of the processor.

FIG. 32 illustrates an instruction set, in which some instructions have been replaced and which is transferred to an instruction register of the processor.

DESCRIPTION OF THE PREFERRED EMBODIMENTS

Hereinafter, preferred embodiments of the present invention will be described with reference to the accompanying drawings.

EMBODIMENT 1

Figure 1:
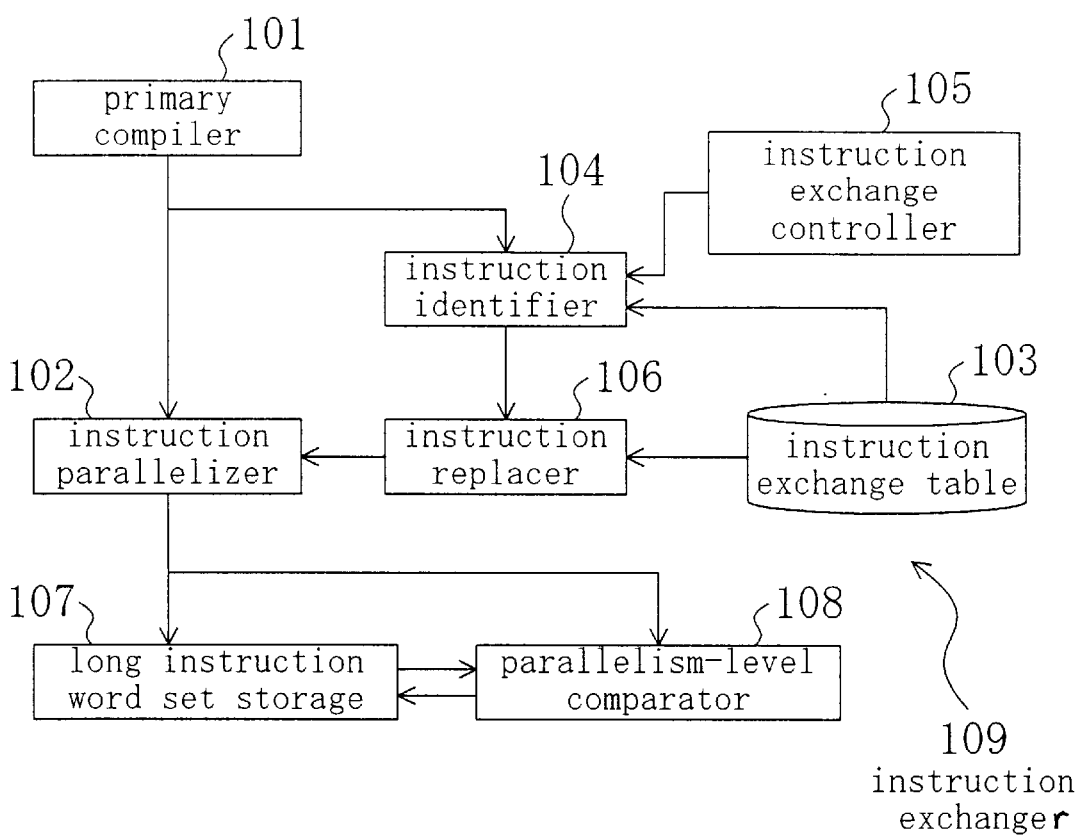
FIG. 1 is a block diagram illustrating a basic concept of a program translator according to a first embodiment of the present invention.

FIG. 1 illustrates a basic concept of a program translator according to a first embodiment of the present invention. As shown in FIG. 1, the program translator includes primary compiler 101, instruction parallelizer 102, instruction exchange table 103, instruction identifier 104, instruction exchange controller 105, instruction replacer 106, long instruction word set storage 107 and parallelism-level comparator 108. The primary compiler 101 compiles a source program into a machine-readable instruction set. The instruction parallelizer 102 generates a set of long instruction words, which will be executed by a target VLIW arithmetic logic unit, from the instruction set. The instruction exchange table 103 is equivalent to the equivalent instruction storage means as defined in the appended claims. The instruction exchange controller 105 controls over the operation of the instruction identifier 104 and stops exchanging instructions if instructions have been exchanged a predetermined number of times. The parallelism-level comparator 108 compares the parallelism level of the set of long instruction words to a reference. The instruction exchange table 103, instruction identifier 104 and instruction replacer 106 together constitute an instruction exchanger 109.

It should be noted that these and other components of the inventive program translator are all implementable as either software programs that run on a computer system or hardware components so constructed as to carry out their intended functions.

Figure 3:
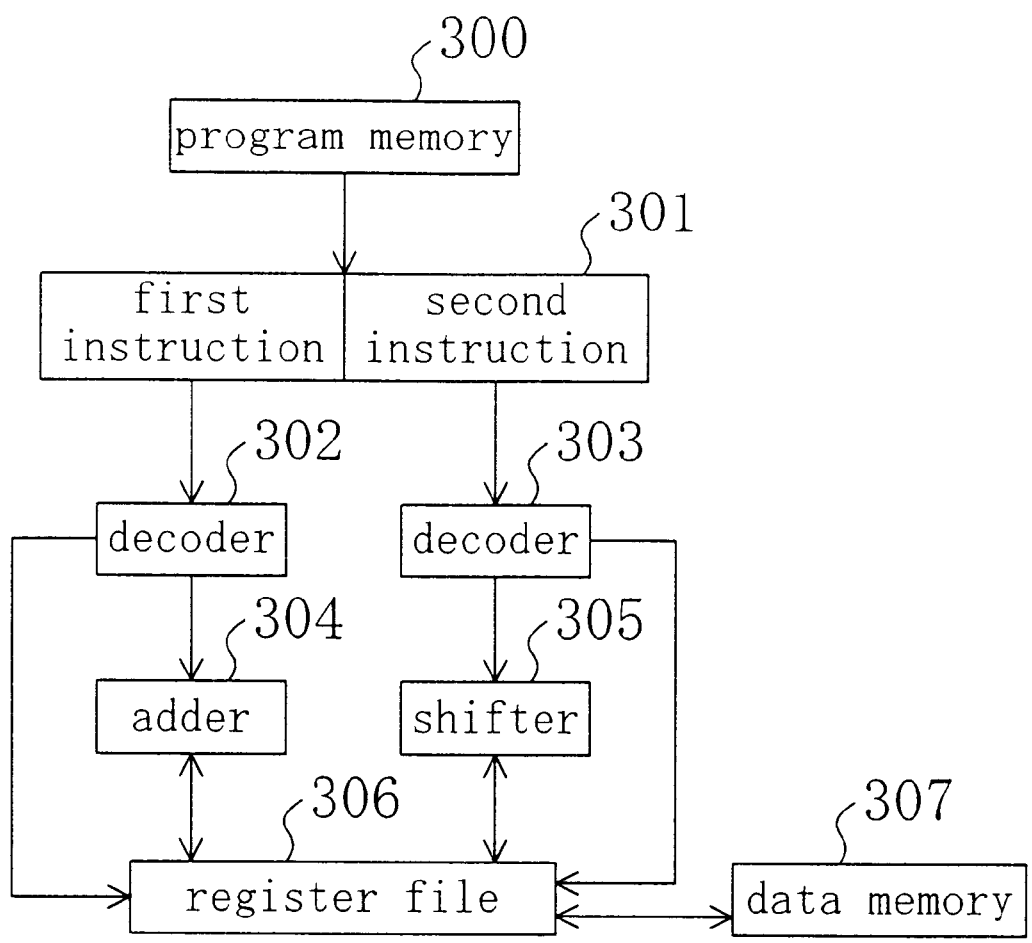
FIG. 3 illustrates a schematic configuration of an arithmetic logic unit that executes a set of long instruction words generated by the program translator.

FIG. 3 illustrates a basic concept of an arithmetic logic unit (ALU) that executes a set of long instruction words generated by the program translator. As shown in FIG. 3, the ALU includes program memory 300, instruction register 301 with two instruction slots, decoders 302, 303, adder 304, shifter 305, register file 306 and data memory 307. Each of the long instruction words is temporarily stored on the first or second instruction slot of the instruction register 301. The decoders 302 and 303 decode the instructions that have been stored on the first and second instruction slots of the instruction register 301, respectively. And the adder 304 and shifter 305 are exemplary execution units as defined in the appended claims.

FIG. 4 illustrates an exemplary instruction set used in the first embodiment. The eight types of instructions shown in FIG. 4 are defined for the ALU shown in FIG. 3. In FIG. 4, Rn and Rm are variables, each representing one of the registers stored on the register file 306; imm is an immediate represented as a positive integer; and mem is a variable representing an address in the data memory 307. A mnemonic describes the contents of an instruction to be written on an instruction slot. On the fourth column, it is indicated whether or not each of the instructions is placeable in the first and/or second slot(s). For example, the ADD instruction is placeable in the first slot, but non-placeable in the second instruction slot.

Figure 2:
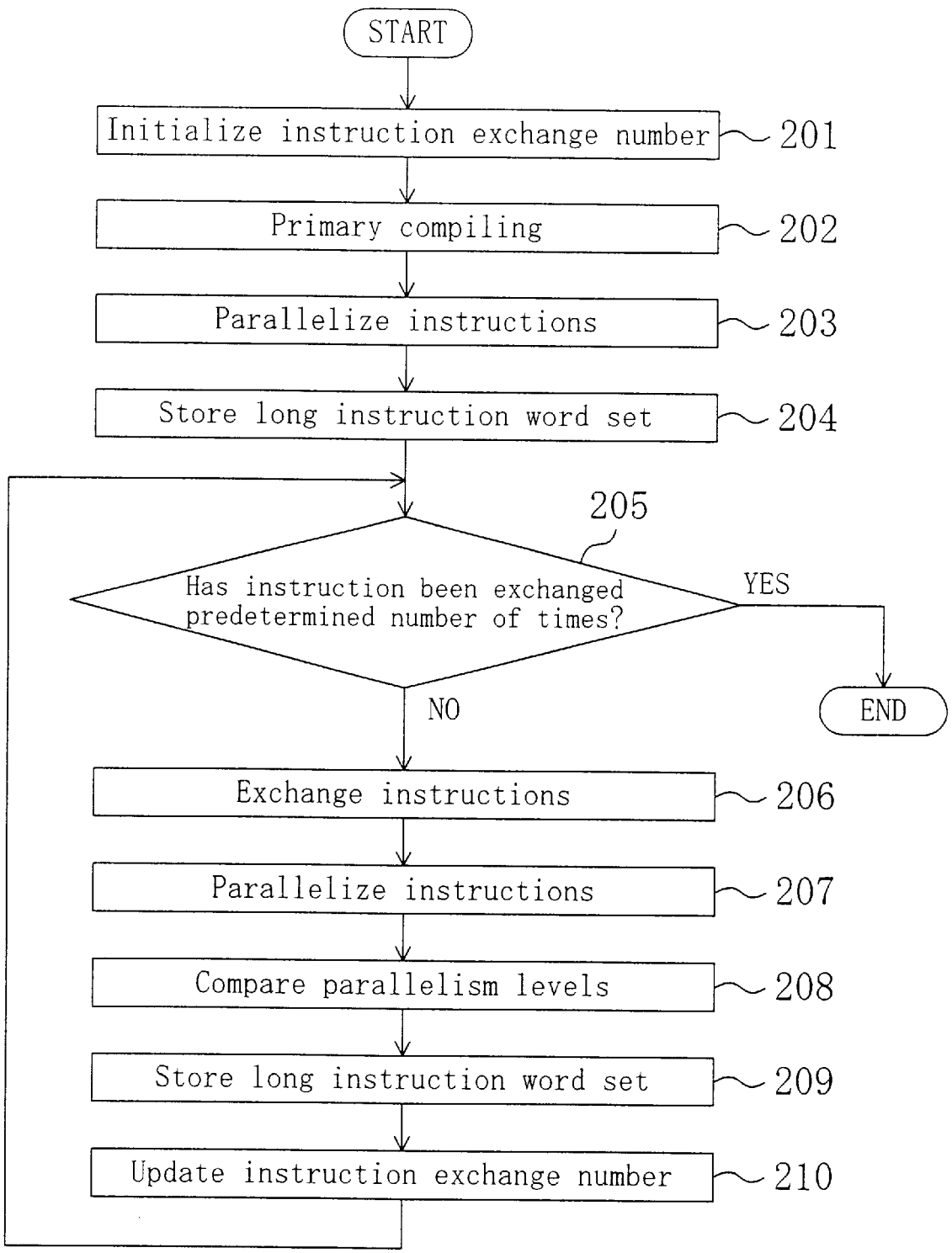
FIG. 2 is a flowchart illustrating how the program translator works.

Hereinafter, it will be described with reference to FIGS. 1, 2, 4 and 5 how the program translator according to the first embodiment works. FIG. 2 is a flowchart illustrating exemplary program translation processing. As shown in FIG. 2, first, in Step 201, the instruction exchange controller 105 initializes the number of times an instruction has been exchanged (in this specification, this number will be called an "instruction exchange number") at zero.

Next, in Step 202, the primary compiler 101 performs primary compiling to translate the source program into a set of computer-executable instructions, which are transferred to the instruction parallelizer 102 and identifier 104.

Then, in Step 203, the instruction parallelizer 102 parallelizes the instructions in the set to create a set of long instruction words, which are transferred to, and stored on, the long instruction word set storage 107 in Step 204.

Subsequently, in Step 205, the instruction exchange controller 105 determines whether or not the instruction has been exchanged the predetermined number of times. If the answer is YES, the procedure ends. Otherwise, the instruction identifier 104 is started. The predetermined number may be an arbitrary number, e.g., the number of instructions included in the instruction set.

Thereafter, in Step 206, the instruction identifier 104 and replacer 106 exchange some of the instructions contained in the instruction set for more preferable ones by reference to the instruction exchange table 103. Multiple sets of instructions, such as that shown in FIG. 5, are stored on the instruction exchange table 103. Each of these instruction sets consists of a plurality of instructions that specify equivalent operations but use mutually different execution units.

For example, at the instruction set 1 stored on the instruction exchange table, ADD instruction add Rm, Rm and SHIFT LEFT instruction asl 1, Rm are registered. Each of these instructions specifies doubling the value stored in the register Rm and then writing the doubled value back to the register Rm. However, the ADD and SHIFT LEFT instructions designate the adder 304 and shifter 305 as respective execution units to be used. Thus, these two instructions specify equivalent operations but designate different execution units.

In Step 206, first, the instruction identifier 104 identifies at least one of the instructions in the given instruction set with an instruction included in an instruction set stored on the instruction exchange table 103. Then, the instruction replacer 106 replaces the identified instruction with another instruction belonging to the same set in which the instruction in question is included. And the instruction set with the newly incorporated instruction is transferred to the instruction parallelizer 102.

Next, in Step 207, the instruction parallelizer 102 parallelizes the instructions to create a new set of long instruction words, which are transferred to the parallelism-level comparator 108.

Subsequently, a comparative, long instruction word set, which has been stored on the long instruction word set storage 107, is also transferred to the parallelism-level comparator 108.

Thereafter, in Step 208, the parallelism-level comparator 108 (which is equivalent to the parallelism-level calculating means as defined in the claims) calculates parallelism levels of these two long instruction word sets and compares them to each other. A parallelism level is herein represented as a quotient obtained by dividing the length of the original instruction set by that of the long instruction word set parallelized. One of the two sets of long instruction words, which results in the higher level of parallelism, is sent back to, and stored on, the long instruction word set storage 107 in Step 209.

Next, in Step 210, the instruction exchange controller 105 updates, or increases by one, the number of times the instruction has been exchanged. Then, the procedure jumps back to Step 205.

The program translator according to the first embodiment can generate a long instruction word set with a high level of parallelism from the source program. Hereinafter, specific processing performed by the program translator will be described with reference to FIGS. 6 through B.

Figures 6, 7:
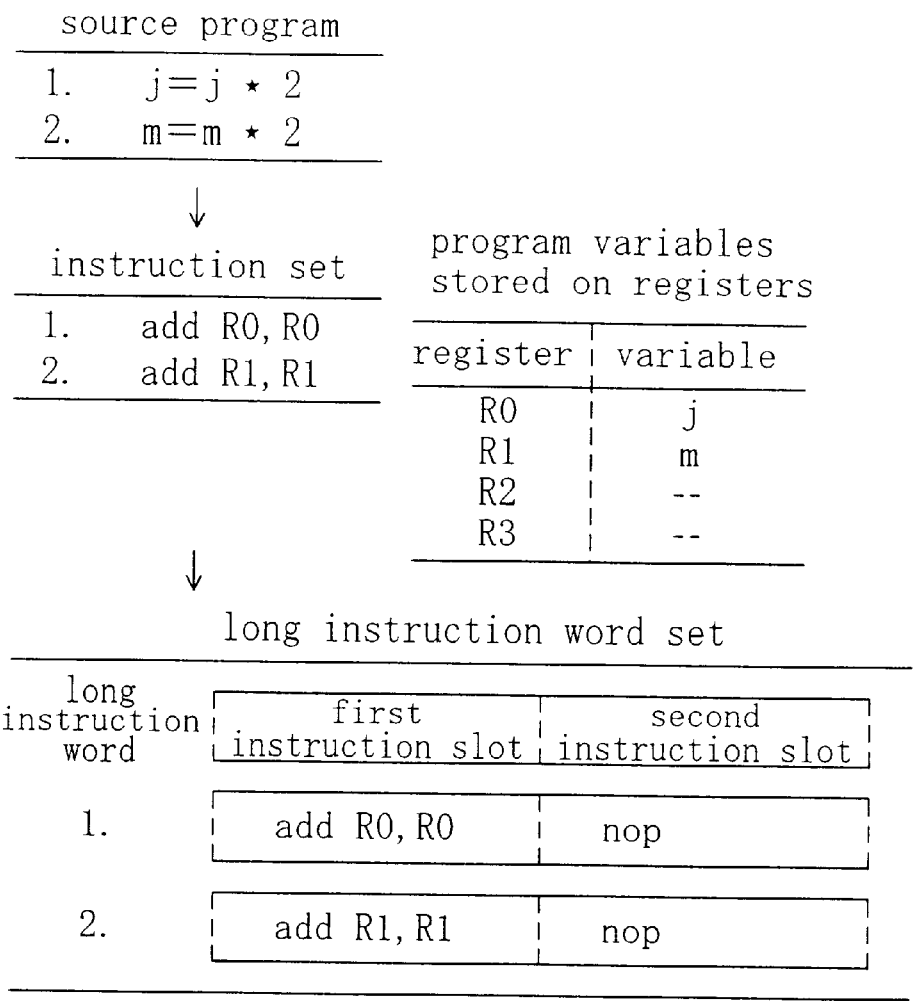
FIG. 6 illustrates exemplary source program, variables allocated to registers, instruction set and long instruction word set that are used in the first embodiment.
FIG. 7 illustrates an instruction set obtained by the program translator according to the first embodiment.

FIG. 6 illustrates a source program, an instruction set that has been created in primary compiling step 201, variables allocated to registers, and a long instruction word set that has been generated in parallelizing step 203. In the illustrated example, the predetermined value of the instruction exchange number is set to one.

First, in Step 204, the long instruction word set shown in FIG. 6 is stored on the long instruction word set storage 107.

Next, in Step 205, it is determined that the instruction exchange number is short of the predetermined number of "1", because no instructions have been exchanged yet. Thus, the procedure advances to Step 206.

In Step 206, the instruction identifier 104 finds the same instruction as that included in a set of instructions stored on the instruction exchange table. In the illustrated example, the first instruction of the instruction set shown in FIG. 6 is the same as the ADD instruction add Rm, Rm included in the instruction set shown in FIG. 5 if the register variable Rm is replaced with R0. Thus, the instruction identifier 104 identifies the former instruction shown in FIG. 6 with the latter instruction shown in FIG. 5. Next, the instruction replacer 106 replaces the instruction add R0, R0 with another instruction belonging to the same instruction set, i.e., SHIFT LEFT instruction asl, 1, Rm (where Rm=R0), thereby obtaining the instruction set shown in FIG. 7.

Figure 8:
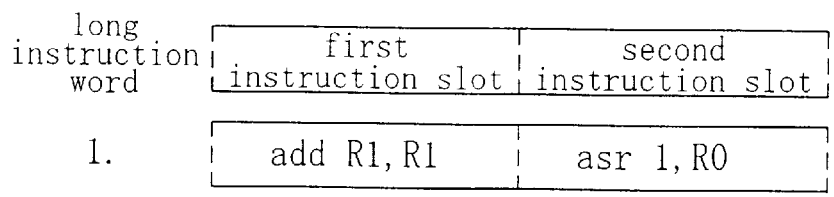
FIG. 8 illustrates a long instruction word obtained by the program translator according to the first embodiment.

Subsequently, in Step 207, the long instruction word shown in FIG. 8 is created from the instruction set shown in FIG. 7.

Next, in Step 208, the original long instruction word set shown in FIG. 6 that has transferred from the long instruction word set storage 107 is compared to the new long instruction word shown in FIG. 8 that has been transferred from the instruction parallelizer 102.

The parallelism level of the long instruction word set shown in FIG. 6 is "1", while that of the long instruction word shown in FIG. 8 is "2". Thus, the long instruction word (i.e., parallelized instruction set) shown in FIG. 8 is transferred to, and stored on, the long instruction word set storage 107 in Step 209.

Then, in Step 210, the instruction exchange number is updated into "1".

Finally, in Step 205, it is determined that the instruction exchange number has reached the predetermined value, i.e., "1" in this case, and therefore, the procedure ends.

As can be seen, the program translator according to the first embodiment can generate the long instruction word with a step number of "1" and a high parallelism level as shown in FIG. 8 from the source program shown in FIG. 6.

EMBODIMENT 2

Figure 9:
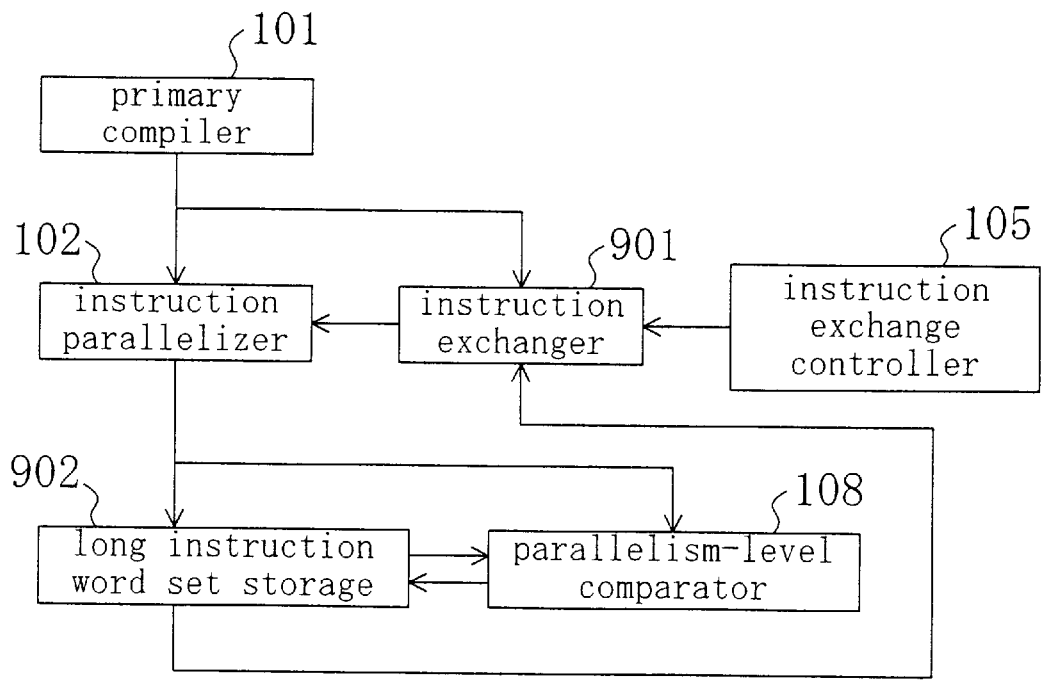
FIG. 9 is a block diagram illustrating a basic concept of a program translator according to a second embodiment of the present invention.
Figure 10:
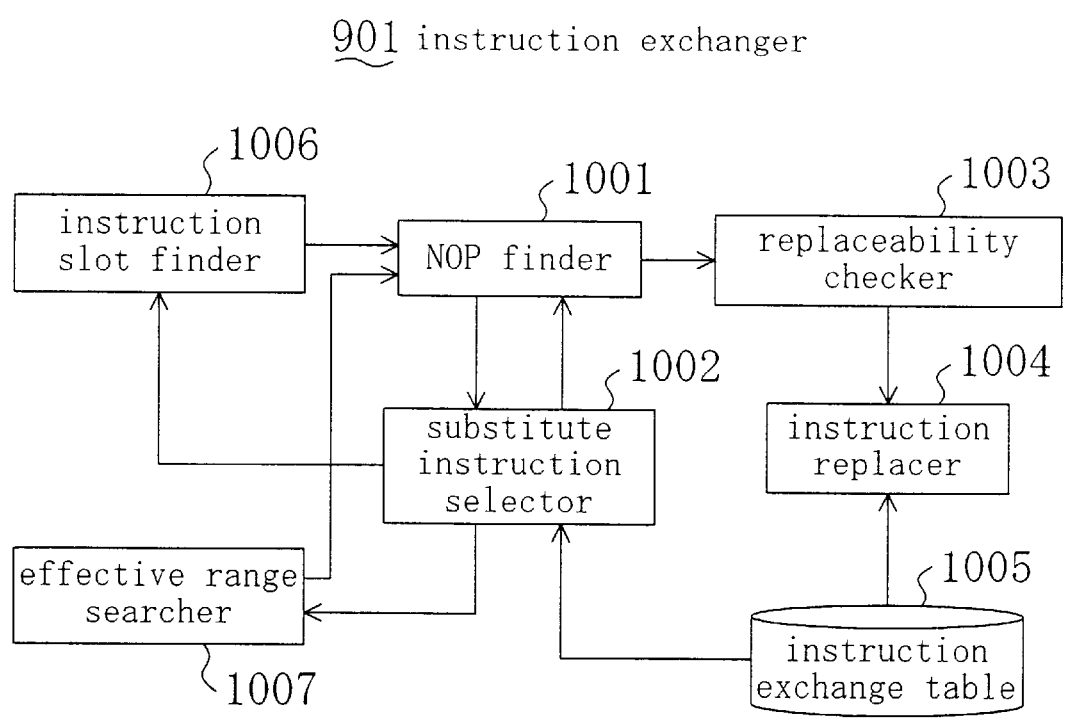
FIG. 10 is a block diagram illustrating a basic concept of an instruction exchanger included in the program translator.

FIG. 9 illustrates a basic concept of a program translator according to a second embodiment of the present invention. In FIG. 9, the same components as those of the program translator shown in FIG. 1 are identified by the same reference numerals. The program translator shown in FIG. 9 includes instruction exchanger 901 and long instruction word set storage 902. FIG. 10 illustrates a basic concept of the instruction exchanger 901 for exchanging instructions in view of the long instruction word set. As shown in FIG. 10, the instruction exchanger 901 includes no-operation instruction (NOP) finder 1001, substitute instruction selector 1002, replaceability checker 1003, instruction replacer 1004, instruction exchange table 1005, instruction slot finder 1006 and effective range searcher 1007. The instruction exchange table 1005 is equivalent to the equivalent instruction storage means as defined in the appended claims.

Figure 11:
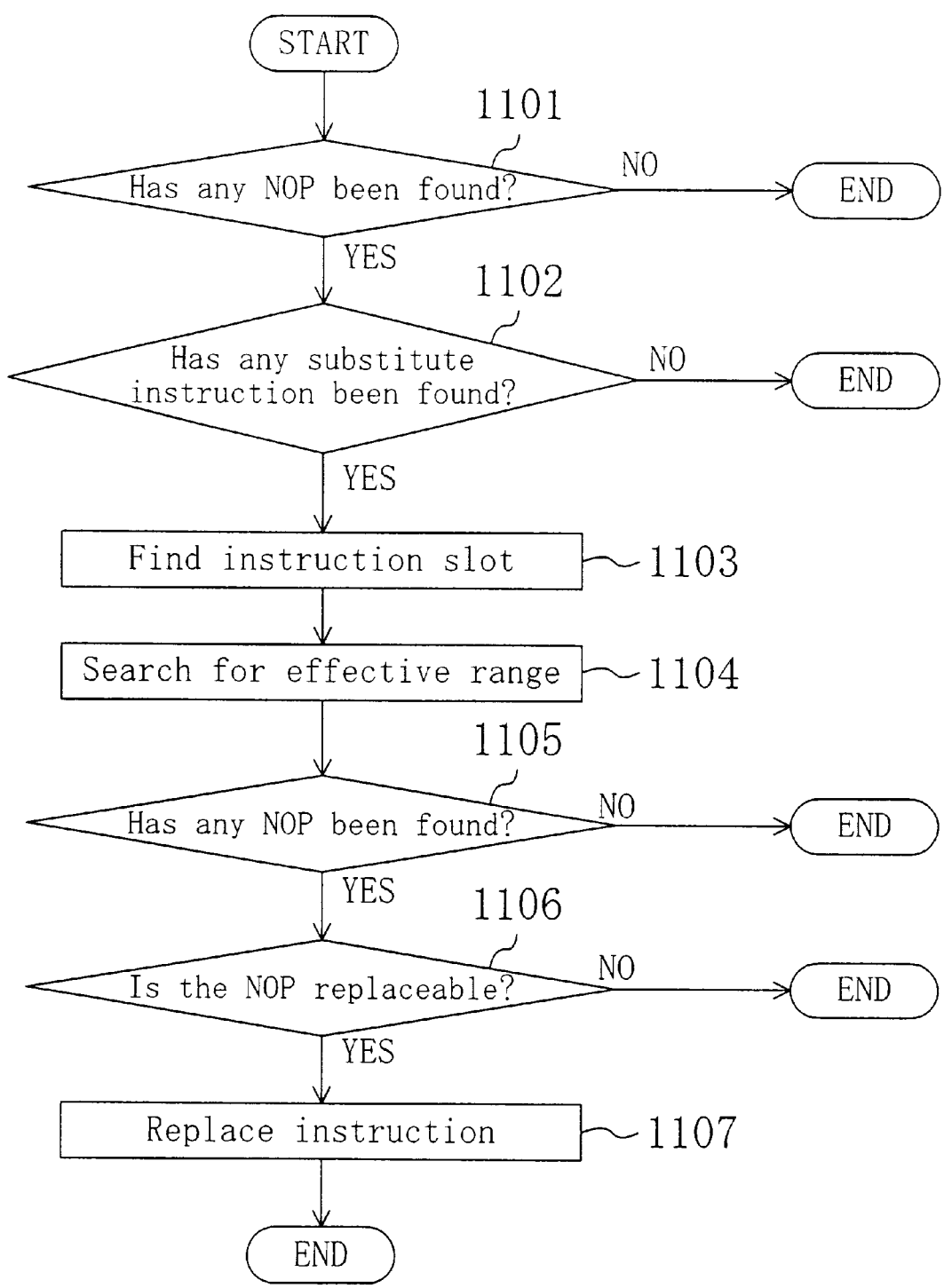
FIG. 11 is a flowchart illustrating how the instruction exchanger works.

Hereinafter, it will be described with reference to FIGS. 10 and 11 how the instruction exchanger 901 works. FIG. 11 is a flowchart illustrating the instruction exchange processing performed by the instruction exchanger 901.

First, in Step 1101, it is determined whether or not the NOP finder 1001 has found an NOP A in the parallelized long instruction word set. If the answer is YES, the procedure advances to Step 1102. Otherwise the procedure ends.

Next, in Step 1102, the substitute instruction selector 1002 determines whether or not an instruction B, which is included in the same long instruction word as the NOP A but is located in a different instruction slot, is found in any of the instruction sets stored on the instruction exchange table 1005. If the answer is YES, then the selector 1002 selects a substitute instruction C, which is different from the instruction B, from the same instruction set and then the procedure advances to Step 1103. Alternatively, if the answer is NO, then the procedure ends at this time.

Then, in Step 1103, the instruction slot finder 1006 finds an instruction slot where the instruction C is placeable and then transfers the slot to the NOP finder 1001.

At the same time, in Step 1104, the effective range searcher 1007 finds out an instruction subset, which does not cause any register conflict with the instruction B, from the long instruction word set and then transfers the subset in the effective range to the NOP finder 1001, too.

In this specification, the "effective range" where no register conflicts arise with the instruction B succeeds instructions, which precede the instruction B and have data dependence relationship with the instruction B, and precedes instructions, which succeed the instruction B and also have data dependence relationship with the instruction B. Specifically, the range starts at a long instruction word, which is next to another long instruction word including one of those preceding instructions that is executed last, and ends at a long instruction word, which is previous to still another long instruction word including one of those succeeding instructions that is executed first.

Also, the "data dependence relationship" is met between a preceding instruction X and a succeeding instruction Y if
1) a register, on which a value has been written in accordance with the preceding instruction X, is referred to in accordance with the succeeding instruction Y; or
2) a value is written in accordance with the succeeding instruction Y on a register that has been referred to in accordance with the preceding instruction X; or
3) a value is written in accordance with the succeeding instruction Y on a register on which another value has already been written in accordance with the preceding instruction X.

Next, in Step 1105, it is determined whether or not the NOP finder 1001 finds an NOP D, different from the NOP A, in the instruction slot of the long instruction word, in which the instruction C is placeable without creating any register conflict with the instruction B. If the answer is YES, then the procedure advances to Step 1106. Otherwise, the procedure ends.

Then, in Step 1106, the replaceability checker 1003 checks whether or not the long instruction word is still valid even if the NOP D included in the long instruction word is replaced with the instruction C. If the answer is YES, then the procedure advances to Step 1107. Otherwise, the procedure ends.

Finally, in Step 1107, the instruction replacer 1004 replaces the instruction B in the long instruction word with the substitute instruction C.

By using this instruction exchanger, the parallelism level of instructions can be increased efficiently.

Hereinafter, a specific example of instruction exchange performed on an instruction set shown in FIG. 12 will be described. A long instruction word set, which is obtained by parallelizing the instruction set shown in FIG. 12 and then stored on the long instruction word set storage 902, is illustrated in FIG. 13.

First, in Step 1101, the NOP finder 1001 finds an NOP in the second instruction slot of the second long instruction word in the long instruction word set shown in FIG. 13.

Next, since the ADD instruction add R1, R1 in the first instruction slot of the second long instruction word is the same as the ADD instruction add Rm, Rm in the first instruction set shown in FIG. 5, the substitute instruction selector 1102 selects a SHIFT LEFT instruction asl 1, R1 (where Rm=R1) as a substitute instruction in Step 1102.

As shown in FIG. 4, the SHIFT LEFT instruction asl 1, Rm is placeable only in the instruction slot. Thus, in Step 1103, the instruction slot finder 1006 transfers this information to the NOP finder 1001.

Subsequently, in Step 1104, the effective range searcher 1007 searches the long instruction word set for an effective range where no register conflicts arise with the ADD instruction add R1, R1 in the first instruction slot of the second long instruction word.

In the first long instruction word preceding the second one, a value is written onto the register R1 in accordance with the SHIFT RIGHT instruction asr 2, R1 in the second instruction slot. And the same register R1 will be referred to in accordance with the ADD instruction add R1, R1. Thus, data dependence relationship is met between these instructions asr 2, R1 and add R1, R1. Accordingly, the "effective range" of the long instruction word set, where no register conflicts arise with the ADD instruction add R1, R1, starts at a long instruction word next to the first long instruction word, i.e., the second long instruction word.

Look at long instruction words succeeding the second long instruction word. The effective range where no register conflicts arise with the ADD instruction add R1, R1 ends at a long instruction word previous to the fourth long instruction word. The reason is as follows. The register R1 is referred to in accordance with the ADD instruction add R2, R1 in the fourth long instruction word and there is data dependence between the ADD instructions add R1, R1 and add R2, R1. In the third long instruction word on the other hand, the register R1 is not referred to. That is to say, the effective range of the long instruction word set, where no register conflicts arise with the ADD instruction add R1, R1, covers the second and third long instruction words.

The SHIFT LEFT instruction is placeable only in the second instruction slot as shown in FIG. 4. Thus, in Step 1105, the NOP finder 1001 searches the second instruction slots of the second and third long instruction words for an NOP other than that included in the second instruction slot of the second long instruction word. As a result, the NOP in the second instruction slot of the third long instruction word is found.

Then, in Step 1106, the replaceability checker 1003 checks whether or not the NOP in the second instruction slot of the third long instruction word is replaceable with the SHIFT LEFT instruction asl 1, R1 to affirm the replaceability.

Finally, in Step 1107, the third instruction add R1, R1 in the instruction set is replaced with the SHIFT LEFT instruction asl 1, R1 to obtain an instruction set shown in FIG. 14.

By parallelizing the instructions included in the instruction set shown in FIG. 14 after the instruction exchange has been carried out in this manner, a long instruction word set shown in FIG. 15 is obtained.

If the instruction exchange is performed without taking the long instruction word set into account, the first instruction add R2, R2 of the instruction set shown in FIG. 12 is replaced to obtain an instruction set shown in FIG. 16. However, if the instruction set shown in FIG. 16 is parallelized, then a long instruction word set shown in FIG. 17 is obtained and the parallelism level cannot be increased. In contrast, by using the program translator that does take the long instruction word set into account, the instruction is not exchanged in vain, thus increasing the parallelism level efficiently.

EMBODIMENT 3

Next, a third exemplary embodiment of the present invention will be described. According to the third embodiment, multiple instructions can be exchanged at a time and the parallelism level can be increased far more sharply than the one-by-one instruction exchange by using alternative program translator and instruction exchange table 1804 shown in FIGS. 18 and 19, respectively.

Figure 18:
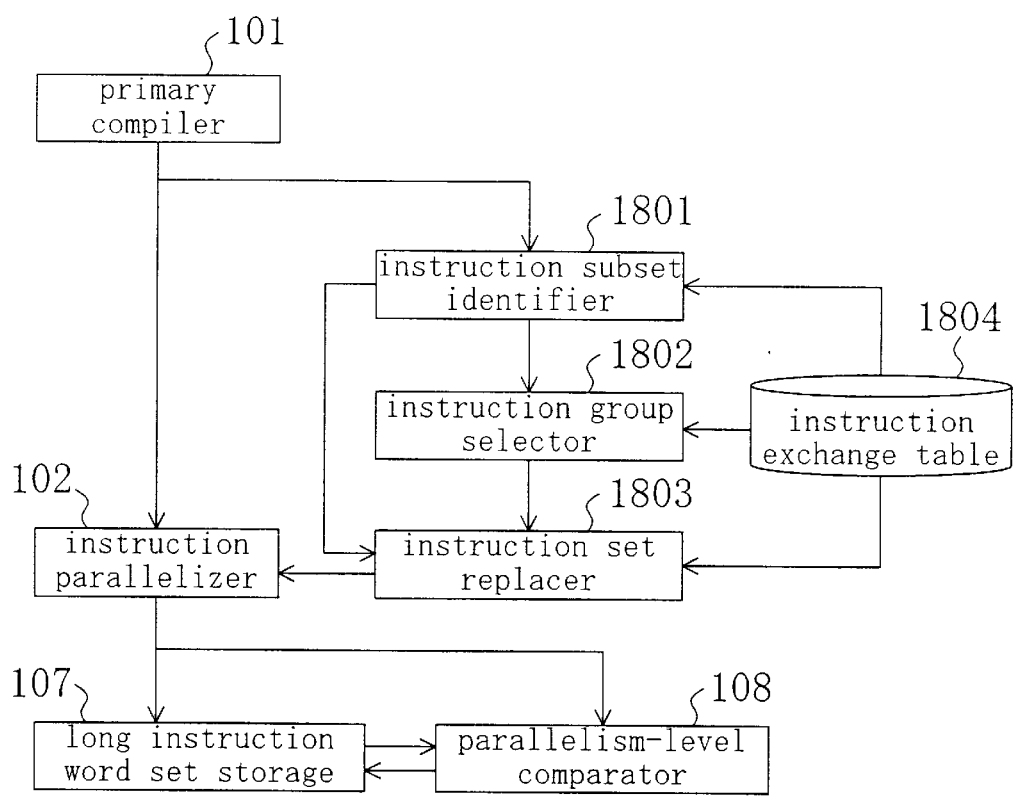
FIG. 18 is a block diagram illustrating a basic concept of a program translator according to a third embodiment of the present invention.

FIG. 18 illustrates a basic concept of the program translator according to the third embodiment. In FIG. 18, the same components as those illustrated in FIG. 1 are identified by the same reference numerals. As shown in FIG. 18, the program translator includes instruction subset identifier 1801, instruction group selector 1802, instruction set replacer 1803 and instruction exchange table 1804, which are equivalent to the instruction subset identifying means, instruction group selecting means, instruction set replacing means and equivalent instruction set storage means, respectively, as defined in the appended claims. FIG. 19 illustrates the contents of the instruction exchange table 1804. As shown in FIG. 19, each instruction set is a collection of one or more numbered instructions, while each instruction group is made up of one or more instruction sets. In a single instruction group, each of the instruction sets consists of the same number of instructions. In all the instruction sets included in a single instruction group, the instructions in the same order use the same execution unit. Each instruction class is made up of one or more instruction groups. Every one of the instruction sets, included in the instruction groups belonging to the same instruction class, consists of one or more instructions specifying the same operation.

The instruction subset identifier 1801 identifies a subset of a given instruction set with any of the instruction sets stored on the instruction exchange table 1804. The instruction group selector 1802 selects an instruction group, different from an instruction group to which the instruction set identified belongs, from the same instruction class. The instruction set replacer 1803 replaces the instruction subset, which has been identified by the instruction subset identifier 1801, with another instruction set belonging to the instruction group selected by the instruction group selector 1802.

In the following example, an instruction set shown in FIG. 20 will be used as the object of exchange, and a long instruction word set shown in FIG. 21 is obtained by parallelizing the instruction set shown in FIG. 20.

The instruction exchange may be performed in the following manner. First, the instruction subset identifier 1801 identifies an instruction subset, consisting of the fourth through sixth instructions shown in FIG. 20, with Instruction Set 4, which is included in Instruction Group 3 belonging to Instruction Class 2 in the instruction exchange table shown in FIG. 19.

Next, the instruction group selector 1802 selects Instruction Group 4, different from Instruction Group 3 which Instruction Set 4 belongs to, from Instruction Class 2.

Then, the instruction set replacer 1803 replaces Instruction Set 4 with Instruction Set 5 belonging to Instruction Group 4, thereby exchanging the instruction set shown in FIG. 20 for that shown in FIG. 22.

A long instruction word set shown in FIG. 23 is obtained by parallelizing the instruction set shown in FIG. 22. Comparing the long instruction word sets shown in FIG. 21 and 23 to each other, it can be seen that a higher level of parallelism and a smaller number of steps are realized in the long instruction word set shown in FIG. 23.

In this manner, even if instructions included in an instruction set such as that shown in FIG. 20 cannot be replaced one by one, a higher level of parallelism is attainable by exchanging multiple instructions at a time.

Also, by defining an instruction group as a collection of instruction sets such that two instruction sets are not replaced with each other within the same instruction group, unnecessary instruction exchange is avoidable, thus increasing the parallelism level efficiently. That is to say, the same set of execution units is used in the same order by multiple instruction sets belonging to a single instruction group. Thus, the replacement between these instruction sets should be prohibited because the parallelism level cannot be increased by doing so. Instead, according to this embodiment, an instruction set in question is replaceable only with an instruction set that could increase the parallelism level.

EMBODIMENT 4

Figure 24:
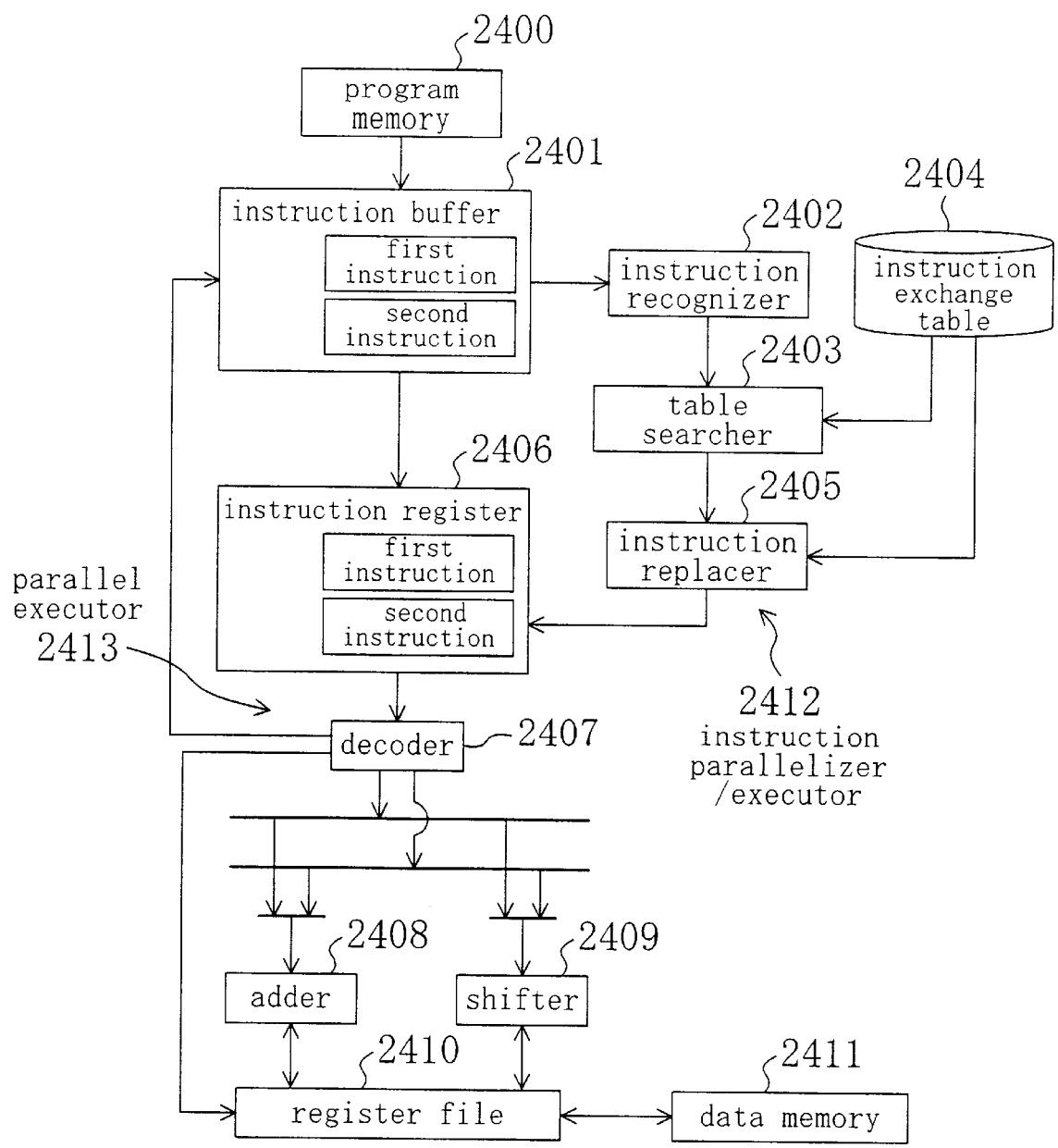
FIG. 24 is a block diagram illustrating an overall configuration of a superscalar processor according to a fourth embodiment of the present invention.

Next, a fourth exemplary embodiment of the present invention will be described. FIG. 24 illustrates a basic concept of a superscalar processor according to the fourth embodiment.

As shown in FIG. 24, the processor includes program memory 2400, instruction buffer 2401, instruction recognizer 2402, table searcher 2403, instruction exchange table 2404, instruction replacer 2405, instruction register 2406, decoder 2407, adder 2408, shifter 2409, register file 2410 and data memory 2411. The instruction replacer 2405 is equivalent to allocation changing means as defined in the appended claims. The adder 2408 and shifter 2409 correspond to the first and second execution units. The instruction recognizer 2402, instruction replacer 2405, instruction register 2406 and decoder 2407 together constitute an instruction parallelizer/executor 2412. The instruction register 2406 and decoder 2407 together constitute parallel executor 2413.

The instruction exchange table 2404 is supposed to have the same structure as that used in the first embodiment and include the instruction set shown in FIG. 5. Also, the same instruction set as that used in the first embodiment will be used again.

Hereinafter, it will be described how the processor according to this embodiment operates. The processor operates through the three pipeline stages of exchanging, decoding and executing instructions. That is to say, the operations in these pipeline stages can be performed in parallel to each other. Also, instructions are supposed to pass through these three pipeline stages in this order, i.e., instruction exchanging, decoding and executing stages.

The operations associated with the instruction exchanging stage will be described.

First, in Step 1, the instruction recognizer 2402 determines whether or not first and second instructions stored on the instruction buffer 2401 both designate the same execution unit, i.e., the adder 2408 or the shifter 2409. If the answer is YES, then the procedure advances to Step 2. Otherwise, the first and second instructions are transferred to the instruction register 2406 to end the instruction exchanging stage.

Next, in Step 2, the table searcher 2403 determines whether or not one of the first and second instructions is contained in any of the instruction sets stored on the instruction exchange table 2404. If the answer is YES, then the procedure advances to Step 3. Otherwise, the first and second instructions are transferred to the instruction register 2406 to end the instruction exchanging stage.

Then, in Step 3, the instruction replacer 2405 replaces the instruction, which is contained in the instruction set stored on the instruction table 2404, with a different instruction belonging to the same instruction set. And the newly incorporated instruction, as well as the other first or second instruction, is transferred to the instruction register 2406.

In the instruction decoding stage, the decoder 2407 decodes the two instructions that have been transferred to the instruction register 2406. If the two instructions decoded both designate the same execution unit, then only the former instruction decoded is passed to the designated execution unit, while the latter instruction is sent back to the instruction buffer 2401. Alternatively, if the two instructions decoded do not use the same execution unit, then the two instructions decoded are both passed to the respective execution units 2408 and 2409.

In the instruction. executing stage, respective logical/arithmetic operations are carried out in accordance with the instruction(s) decoded by the decoder 2407.

The superscalar processor according to this embodiment can execute multiple instructions in parallel, thus speeding up the program processing. Hereinafter, an exemplary operation of the processor will be described with reference to FIGS. 5, 25, 26 and 27.

Figures 25, 26, 27:
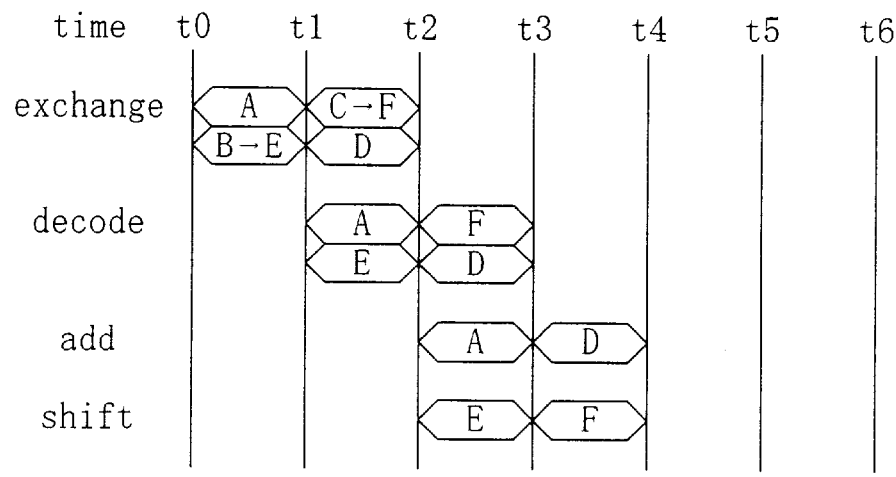
FIG. 25 illustrates an exemplary instruction set included in a program stored on a program memory of the processor.
FIG. 26 illustrates an instruction set, in which some instructions have been replaced and which is transferred to an instruction register of the processor.
FIG. 27 illustrates pipeline processing performed by the processor.

FIG. 25 illustrates an instruction set included in a program stored on the program memory 2400. FIG. 26 illustrates an instruction set transferred to the instruction register 2406. FIG. 27 illustrates pipeline processing performed by the processor to execute the program.

As shown in FIG. 27, operations associated with the instruction exchanging stage are performed between times t0 and t1.

First, in Step 1, the instruction recognizer 2402 finds that the instructions A: add R3, R2 and B: add R0, R0 both use the adder 2406. Thus, the procedure advances to Step 2.

Next, in Step 2, the table searcher 2403 finds the instruction B in the instruction set stored on the instruction exchange table 2404 (see FIG. 5). Thus, the procedure advances to Step 3.

Then, in Step 3, the instruction replacer 2405 replaces the instruction B with the other instruction E: asl 1, R0 belonging to the same instruction set shown in FIG. 5. And the instructions A and E are transferred to the instruction register 2406.

Referring to FIG. 27, operations associated with the instruction exchanging and decoding stages are performed in parallel between times t1 and t2.

First, in Step 1, the instruction recognizer 2402 finds that the instructions C: add R1, R1 and D: sub R2, R0 both use the adder 2408. Thus, the procedure advances to Step 2.

Next, in Step 2, the table searcher 2403 finds the instruction C in the instruction set stored on the instruction exchange table 2404 (see FIG. 5). Thus, the procedure advances to Step 3.

Then, in Step 3, the instruction replacer 2405 replaces the instruction C with the other instruction F: asl 1, R1 belonging to the same instruction set shown in FIG. 5. And the instructions F and D are transferred to the instruction register 2406.

In the meantime, the instructions A and E, which have been already transferred to the instruction register 2406, are decoded by the decoder 2407.

As can be seen from FIG. 27, operations associated with the instruction decoding and executing stages are performed in parallel between times t2 and t3.

Specifically, the instructions F and D, which have been already transferred to the instruction register 2406, are decoded by the decoder 2407.

At the same time, the adder 2408 substitutes the sum of R2 and R3 for R2 in accordance with the instruction A decoded, while the shifter 2409 shifts the value of R0 to the left by one bit and substitutes the result for R0 in accordance with the instruction E decoded.

Finally, operations associated with the instruction executing stage are performed between times t3 and t4.

The adder 2408 substitutes the difference between R2 and R0 for R0 in accordance with the instruction D decoded, while the shifter 2409 shifts the value of R1 to the left by one bit and substitutes the result for R1 in accordance with the instruction F decoded.

As can be seen, the processor according to this embodiment replaces an instruction that is supposed to be executed by the adder with an equivalent instruction executable by the shifter. In this manner, instructions can be executed at a higher level of parallelism and the program processing speed can be increased.

EMBODIMENT 5

Figure 28:
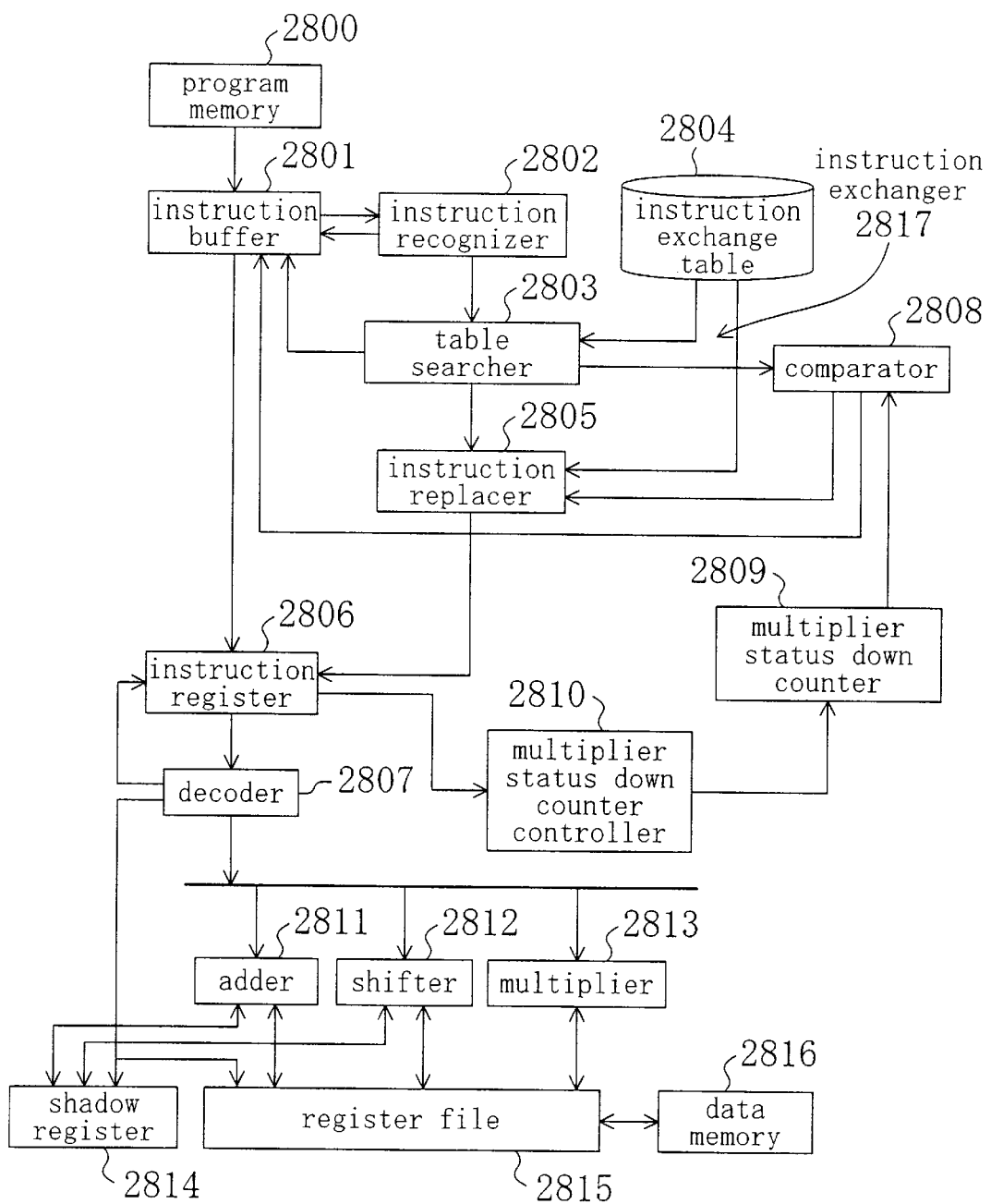
FIG. 28 is a block diagram illustrating an overall configuration of a processor according to a fifth embodiment of the present invention.

Next, a fifth exemplary embodiment of the present invention will be described. FIG. 28 illustrates a basic concept of a processor according to the fifth embodiment.

As shown in FIG. 28, the processor includes program memory 2800, instruction buffer 2801, instruction recognizer 2802, table searcher 2803, instruction exchange table 2804, instruction replacer 2805, instruction register 2806, decoder 2807, comparator 2808, multiplier status down counter 2809, multiplier status down counter controller 2810, adder 2811, shifter 2812, multiplier 2813, shadow registers 2814, register file 2815 and data memory 2816. The table searcher 2803 is equivalent to instruction set searching means and the multiplier 2813, adder 2811 and shifter 2812 are equivalent to first, second and third execution units as defined in the appended claims. The table searcher 2803, comparator 2808 and instruction replacer 2805 together constitute an instruction exchanger 2817. The multiplier status down counter 2809 consists of variables, which are integers equal to or greater than zero. That is to say, the initial value of the down counter 2809 is zero.

FIG. 29 illustrates an exemplary instruction set used in the fifth embodiment. The nine types of instructions shown in FIG. 29 are defined for the processor according to this embodiment. In FIG. 29, Rn and Rm are variables, each representing one of registers stored on the register file 2815; imm is an immediate represented as a positive integer; and mem is a variable representing an address in the data memory 2816. A mnemonic describes the contents of an instruction to be written on the instruction register 2806. On the rightmost column, a time taken to execute each instruction is indicated by the number of cycles.

The instruction exchange table 2804 consists of multiple instruction groups shown in FIG. 30. Each instruction group includes an instruction to be exchanged, a set of substitute instructions and the number of substitute instructions. In the illustrated embodiment, each instruction to be exchanged is MULTIPLY instruction that designates the multiplier 2813 as its execution unit. Each set of substitute instructions is so constructed as to execute the same operation as that represented by the MULTIPLY instruction by using execution units other than the multiplier 2813. Also, a register variable RR used in the sets of substitute instructions represents a corresponding one of the shadow registers 2814.

Next, it will be described how the processor according to this embodiment operates.

The processor operates through the three pipeline stages of exchanging, decoding and executing instructions. That is to say, the operations in these pipeline stages can be performed in parallel to each other. Also, each and every instruction is supposed to pass through these three pipeline stages in this order, i.e., instruction exchanging, decoding and executing stages.

Hereinafter, the operations associated with the instruction exchanging stage will be described.

First, in Step 1, the instruction recognizer 2802 determines whether or not an instruction, which has been transferred from the program memory 2800 to the instruction buffer 2801, is a MULTIPLY instruction. If the answer is NO, then the instruction is further transferred to the instruction register 2806 to jump to Step 6. If the answer is YES, the procedure advances to Step 2.

Next, in Step 2, the table searcher 2803 searches the instruction exchange table 2804 for the MULTIPLY instruction to determine whether or not the MULTIPLY instruction is an instruction to be exchanged belonging to any instruction group. If the answer is YES, then the number of substitute instructions defined for the instruction group in question is transferred to the comparator 2808 and the set of substitute instructions in the group in question is transferred to the instruction replacer 2805 to proceed to Step 3. Alternatively, if the answer is NO, then the MULTIPLY instruction is transferred from the instruction buffer 2801 to the instruction register 2806 to jump to Step 7.

Then, in Step 3, the comparator 2808 compares the count of the multiplier status down counter 2809 to the number of substitute instructions that has been transferred from the table searcher 2803. If the count of the multiplier status down counter 2809 is found smaller than the number of substitute instructions, then the MULTIPLY instruction is transferred from the instruction buffer 2801 to the instruction register 2806 to jump to Step 7. Otherwise, the procedure advances to Step 4.

Subsequently, in Step 4, the instruction replacer 2805 transfers the set of substitute instructions, which has been transferred from the table searcher 2803, to the instruction register 2806 to proceed to Step 5.

Thereafter, in Step 5, if the count of the multiplier status down counter 2809 is positive, then the multiplier status down counter controller 2810 subtracts the number of substitute instructions plus one from that count. And if the remainder is still positive, then the controller 2810 sets the multiplier status down counter 2809 at that value. Otherwise, the controller 2810 sets the multiplier status down counter 2809 at zero to end the instruction exchanging stage.

Next, in Step 6, if the count of the multiplier status down counter 2809 is still positive, then the multiplier status down counter controller 2810 decreases the count by one to end the instruction exchanging stage.

Then, in Step 7, the multiplier status down counter controller 2810 sets the count of the multiplier status down counter 2809 at four to end the instruction exchanging stage.

In the instruction decoding stage, the first one of the instructions stored on the instruction register 2806 is decoded by the decoder 2807 and then transferred to respective execution units. However, if the first instruction is MULTIPLY instruction and if the multiplier 2813 has not completed preceding multiplication yet, then the instruction is returned to the top of the instruction register 2806.

In instruction executing stage, the logical/arithmetic operations are executed in accordance with the instructions decoded by the decoder 2807. However, if the multiplier 2813 has not completed preceding multiplication yet, then the multiplier 2813 may continue the multiplication.

In the processor according to this embodiment, while a first MULTIPLY instruction is being executed by the multiplier in multiple cycles, a second MULTIPLY instruction is replaced with a set of instructions designating a different execution unit and then executed, thereby speeding up the program processing. Hereinafter, an exemplary operation of the processor will be described with reference to FIGS. 31 through 33.

Figure 33:
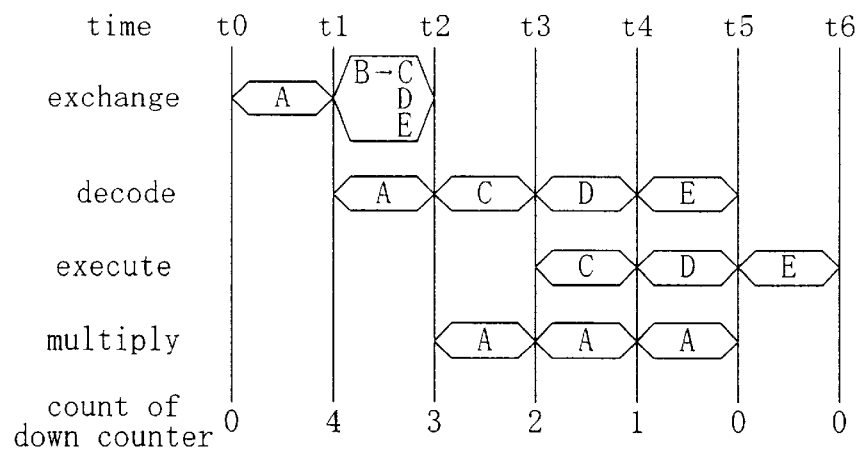
FIG. 33 illustrates pipeline processing performed by the processor.
Figure 34:
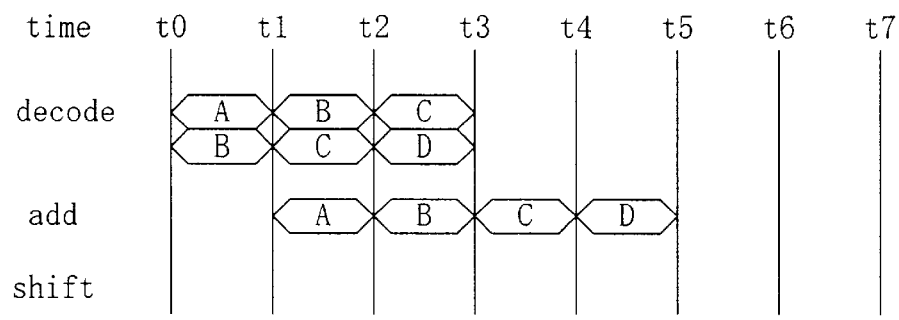
FIG. 34 illustrates pipeline processing performed by a prior art superscalar processor.
Figure 35:
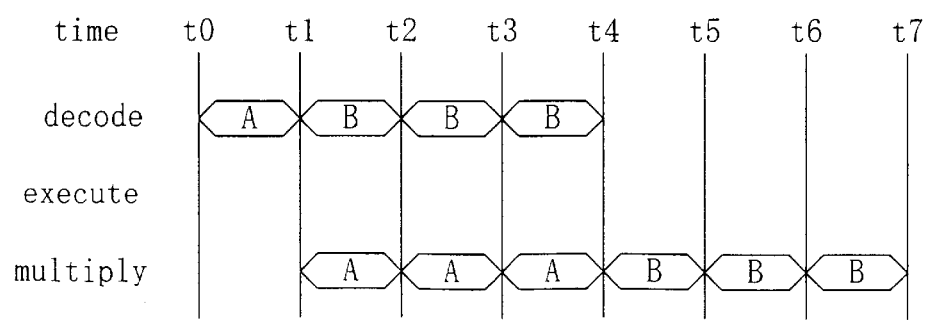
FIG. 35 illustrates pipeline processing performed by another prior art processor.

FIG. 31 illustrates an exemplary instruction set included in a program stored on the program memory 2800. FIG. 32 illustrates an instruction set transferred to the instruction register 2806. FIG. 33 illustrates pipeline processing performed by the processor.

As shown in FIG. 33, operations associated with the instruction exchanging stage are performed between times t0 and t1.

First, in Step 1, the instruction recognizer 2802 recognizes the instruction A: mul 5, R0 as a MULTIPLY instruction. Thus, the procedure advances to Step 2.

Next, in Step 2, the table searcher 2803 searches the instruction exchange table 2804 for the instruction A to find that the instruction A is the instruction to be exchanged belonging to Instruction Group 4 as shown in FIG. 30. Accordingly, the number of substitute instructions as defined for Instruction Group 4, i.e., three, is transferred to the comparator 2808 and the set of substitute instructions belonging to Instruction Group 4 is transferred to the instruction replacer 2805. Then, the procedure advances to Step 3.

Subsequently, in Step 3, the comparator 2808 compares the number of substitute instructions "3" to the count of the multiplier status down counter 2809. Since the count of the multiplier status down counter 2809 is "0", the MULTIPLY instruction A is transferred to the instruction register 2806 and the procedure jumps to Step 7.

Then, in Step 7, the multiplier status down counter controller 2810 sets the count of the multiplier status down counter 2809 at "4" to end the instruction exchanging stage.

Referring to FIG. 33, operations associated with the instruction exchanging and decoding stages are performed in parallel between times t1 and t2.

First, in Step 1, the instruction recognizer 2802 recognizes the next instruction B: mul 3, R1 as a MULTIPLY instruction. Thus, the procedure advances to Step 2.

Next, in Step 2, the table searcher 2803 searches the instruction exchange table 2804 for the instruction B to find that the instruction B is the instruction to be exchanged belonging to Instruction Group 2 as shown in FIG. 30. Accordingly, the number of substitute instructions as defined for Instruction Group 2, i.e., three, is transferred to the comparator 2808 and the set of substitute instructions belonging to Instruction Group 2 is transferred to the instruction replacer 2805. Then, the procedure advances to Step 3.

Subsequently, in Step 3, the comparator 2808 compares the number of substitute instructions (i.e., 3) to the count of the multiplier status down counter 2809 (i.e., 4). Since the count of the counter 2809 is larger than the number of substitute instructions, the MULTIPLY instruction A is transferred to the instruction register 2806 and the procedure advances to Step 4.

At the same time, in Step 4, the instruction replacer 2805 transfers the set of substitute instructions belonging to instruction Group 2, i.e., instructions C: mov R1, RR, D: asl 1, R1 and E: add RR, R1, to the instruction register 2806 and the procedure advances to Step 5.

Next, in Step 5, the multiplier status down counter controller 2810 subtracts the sum of the number of substitute instructions "3" and "1" from the count "4" of the multiplier status down counter 2809. Since the result is zero, the multiplier status down counter controller 2810 sets the count of the multiplier status down counter 2809 at zero to end the instruction exchanging stage.

In the meantime, the decoder 2807 decodes the instruction A in the instruction decoding stage.

As can be seen from FIG. 33, operations associated with the instruction decoding and executing stages are performed between times t2 and t3.

In the instruction decoding stage, the decoder 2807 decodes the instruction C.

In the instruction executing stage on the other hand, the multiplier 2811 multiplies R0 and 5 together in accordance with the instruction A decoded. Since the number of cycles taken to execute this MULTIPLY instruction is three, this multiplication ends at a time t5.

As shown in FIG. 33, operations associated with the instruction decoding and executing stages are performed between times t3 and t4.

In the instruction decoding stage, the decoder 2807 decodes the instruction D.

In the instruction executing stage on the other hand, the value of R1 is transferred to RR in accordance with the instruction C decoded. At the same time, the multiplier 2811 continues the multiplication of R0 and 5.

Referring to FIG. 33, operations associated with the instruction decoding and executing stages are performed between times t4 and t5.

In the instruction decoding stage, the decoder 2807 decodes the instruction E.

In the instruction executing stage on the other hand, the shifter 2810 shifts the value of R1 to the left by one bit in accordance with the instruction D decoded. On the other hand, the multiplier 2811 continues the multiplication of R0 and 5.

Finally, operations associated with the instruction executing stage are performed between times t5 and t6.

In the instruction executing stage, the adder 2809 adds the values of R1 and RR together in accordance with the instruction E decoded.

As can be seen, the processor according to this embodiment replaces an instruction that is supposed to be executed by the multiplier with a set of equivalent instructions to be executed by the shifter and the adder. In this manner, instructions can be executed at a higher level of parallelism and the program processing speed can be increased.

What is claimed is:

1. A program translator comprising:

instruction exchanging means for exchanging one of instructions included in a program for another instruction, the latter instruction specifying an operation equivalent to that specified by the former instruction, the latter instruction designating, as a target of the operation, an execution unit that is different from an execution unit designated as a target by the former instruction; and instruction parallelizing means for placing the instructions in the program, in which the former instruction has been exchanged for the latter instruction by the exchanging means, at such locations as being parallelly executable by a processor.

2. The program translator of claim 1, wherein the instruction exchanging means comprises:

equivalent instruction storage means for storing multiple instructions that specify equivalent operations but designate mutually different execution units as targets of the operations;

instruction identifying means for identifying at least one of the instructions included in the program with one of the instructions stored on the storage means; and instruction replacing means for replacing the at least one instruction, which has been identified by the identifying means, with another one of the instructions that is also stored on the storage means but is different from the at least one instruction.

3. The program translator of claim 1, further comprising parallelism-level calculating means for calculating a parallelism level of the instructions that have been parallelized by the parallelizing means.

4. The program translator of claim 1, wherein the instruction exchanging means comprises:

equivalent instruction set storage means for storing multiple instruction sets specifying mutually equivalent operations, wherein if two of the instruction sets each designate the same set of execution units as targets of their operations in the same order, these two instruction sets belong to the same group of instructions;

instruction subset identifying means for identifying a subset of the program with one of the instruction sets stored on the storage means;

instruction group selecting means for selecting an instruction group that is different from a group to which the instruction set, identified by the identifying means with the instruction subset, belongs; and instruction set replacing means for replacing the instruction subset, which has been identified by the identifying means, with an instruction set included in the instruction group selected by the selecting means.

5. A program translator comprising:

instruction parallelizing means for generating a set of parallelized instructions by placing instructions at such locations as being parallelly executable by a processor;

equivalent instruction storage means for storing multiple instructions that specify equivalent operations but designate mutually different execution units as targets of the operations;

no-operation instruction finding means for finding a no-operation instruction from the parallelized instructions located in a predetermined range of the parallelized instruction set;

substitute instruction selecting means for selecting, if one of the parallelized instructions including the no-operation instruction found is the same as one of the instructions stored on the storage means, a substitute one of the instructions, which is also stored on the storage means but is different from the instruction included in the parallelized instructions; and instruction replacing means for replacing the instruction included in the parallelized instructions with the substitute instruction selected by the selecting means.

6. The program translator of claim 5, further comprising:

effective range searching means for searching the parallelized instruction set for a subset of instructions, which does not cause register conflict with any of the parallelized instructions; and second no-operation instruction finding means for finding a no-operation instruction from parallelized instructions included in the instruction subset that has been found by the searching means, wherein the replacing means replaces the no-operation instruction, which has been found by the second finding means, with the instruction that has been selected by the selecting means.

7. A processor comprising:

a first execution unit;

a second execution unit; and instruction parallelizing/executing means for executing two instructions, which designate the first execution unit as a target, in parallel by allocating one of the two instructions to the second execution unit;

wherein the parallelizing/executing means comprises:

instruction recognizing means for recognizing the two instructions as instructions both designating the first execution unit as the target;

allocation changing means for allocating one of the two instructions that designate the first execution unit as the target to the second execution unit; and parallel executing means for executing the two instructions in parallel.

8. A processor comprising:

a first execution unit, on which an operation will be performed in a first number of cycles;

at least one second execution unit, on which an operation will be performed in a second number of cycles, the second number being smaller than the first number;

instruction recognizing means for recognizing a predetermined instruction as an instruction designating the first execution unit as a target of the operation; and instruction exchanging means for exchanging the predetermined instruction that has been recognized by the recognizing means with at least one instruction that specifies an operation equivalent to that specified by the instruction and designates the second execution unit as a target.

9. The processor of claim 8, wherein exchanging means comprises:

instruction set searching means for searching for an instruction set that specifies an operation equivalent to that specified by the predetermined instruction;

comparing means for comparing a point in time execution of the instruction set found by the searching means is completed to a point in time execution of the predetermined instruction is completed; and instruction replacing means for replacing, if the comparing means has determined that the execution of the instruction set will be completed earlier than that of the predetermined instruction, the predetermined instruction with the instruction set.

* * * * *